(12) United States Patent
Chen et al.

(10) Patent No.: US 10,095,721 B2
(45) Date of Patent: Oct. 9, 2018

(54) INDEX BUILDING IN RESPONSE TO DATA INPUT

(71) Applicant: International Business Machines Corporation, Armonk, NY (US)

(72) Inventors: Ke Chen, Beijing (CN); Shuo Li, Beijing (CN); Ping Liang, Beijing (CN); Xin Ying Yang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/670,773

(22) Filed: Mar. 27, 2015

(65) Prior Publication Data

US 2016/0283537 A1 Sep. 29, 2016

(51) Int. Cl.
*G06F 17/30* (2006.01)

(52) U.S. Cl.
CPC .. *G06F 17/30327* (2013.01); *G06F 17/30336* (2013.01); *G06F 17/30339* (2013.01)

(58) Field of Classification Search
None
See application file for complete search history.

(56) References Cited

U.S. PATENT DOCUMENTS

| | | | | |
|---|---|---|---|---|
| 5,123,104 A * | 6/1992 | Levine | ............. | G06F 17/30327 |
| 5,222,235 A * | 6/1993 | Hintz | ................ | G06F 17/30312 |
| 5,644,763 A * | 7/1997 | Roy | .................. | G06F 17/30327 |
| 6,477,535 B1 * | 11/2002 | Mirzadeh | ......... | G06F 17/30595 |
| 7,363,284 B1 * | 4/2008 | Plasek | ............... | G06F 17/30327 |
| 7,792,839 B2 | 9/2010 | Hrle et al. | | |
| 7,809,759 B1 | 10/2010 | Bruso et al. | | |
| 8,204,912 B2 * | 6/2012 | Bamford | ........... | G06F 17/30327 |
| | | | | 707/797 |
| 8,626,717 B2 | 1/2014 | Bendakovsky et al. | | |
| 8,682,872 B2 | 3/2014 | Bright | | |
| 8,832,036 B2 | 9/2014 | Xu et al. | | |
| 2005/0182782 A1 * | 8/2005 | Anderson | ......... | G06F 17/30445 |
| 2009/0089334 A1 * | 4/2009 | Mohamed | ......... | G06F 17/30339 |
| 2010/0146003 A1 * | 6/2010 | Bruso | ............... | G06F 17/30327 |
| | | | | 707/797 |

(Continued)

OTHER PUBLICATIONS

Graefe, "Modern B-Tree Techniques", Foundations and Trends in Databases, vol. 3, No. 4, pp. 203-402, 2011, Hewlett-Packard Laboratories.*

(Continued)

*Primary Examiner* — Aleksandr Kerzhner
*Assistant Examiner* — Eddy Cheung
(74) *Attorney, Agent, or Firm* — Christopher K. McLane; Daniel R. Simek

(57) ABSTRACT

In a method for managing a data index, one or more processors inserting one or more rows of data sequentially into a data table of a database. The method further includes inserting index entries that correspond to the inserted one or more rows of data sequentially into an index of the data table, wherein an index B-tree structure is not built initially during insertion. The method further includes determining whether one of: (i) a size threshold of index entries inserted into the index and (ii) a time threshold for inserting index entries into the index, is met. The method further includes responsive to determining that one of: (i) a size threshold of index entries inserted into the index and (ii) a time threshold for inserting index entries into the index, is met, building an index-B-tree structure that includes the index entries inserted into the index.

18 Claims, 3 Drawing Sheets

(56) References Cited

U.S. PATENT DOCUMENTS

| | | | |
|---|---|---|---|
| 2012/0054159 A1* | 3/2012 | Xu | G06F 17/30 707/692 |
| 2014/0095505 A1* | 4/2014 | Blanchflower ... | G06F 17/30091 707/737 |
| 2014/0279856 A1* | 9/2014 | Srinivasan | G06F 17/30345 707/609 |
| 2014/0297651 A1 | 10/2014 | Shadmon | |

OTHER PUBLICATIONS

Sen et al., "Deletion without rebalancing in balanced binary trees", Proceedings of the twenty-first annual ACM-SIAM symposium on Discrete Algorithms, pp. 1490-1499, 2010, ACM.*

Cui et al., "Contorting high dimensional data for efficient main memory KNN processing", Proceedings of the 2003 ACM SIGMOD international conference on Management of data, pp. 479-490, 2003, ACM.*

Graefe, "Sorting and Indexing With Partitioned B-Trees", Proceedings of the 2003 CIDR Conference, 2003, VLDB.*

Klein et al., "Short Note: Optimal B-Tree Packing", Information Systems, vol. 16, No. 2, pp. 239-243, 1991, Pergamon Press.*

"Index splitting for sequential INSERT activity", IBM Knowledge Center, downloaded Jan. 30, 2015, <http://www-01.ibm.com/support/knowledgecenter/SSEPEK_10.0.0/com.ibm.db2z10.doc.perf/src/tpc/db2z_indexsplit4seqinsert.dita>.

List of IBM Patents or Patent Applications Treated As Related (Appendix P), filed herewith, 2 pages.

U.S. Appl. No. 14/976,153, filed Dec. 21, 2015, This Document Is Not Provided Because It Is Readily Available to the Examiner.

* cited by examiner

INDEX BUILDING IN RESPONSE TO DATA INPUT

BACKGROUND OF THE INVENTION

The present invention relates generally to the field of data management, and more particularly to building data indexes.

A data set is a collection of data where every column of the table represents a particular value and each row corresponds to a given member of the data set (e.g., a database table). The data set lists values for each of the variables, such as height and weight of an object, for each member of the data set. Commonly, a data set corresponds to the contents of a single database table or a single statistical matrix. The values in a data set may be numbers, such as real numbers or integers (e.g., representing a person's height in centimeters) but may also be nominal data (i.e., not consisting of numerical values), for example, representing a characteristic of a person. More generally, values may be of any of the kinds described as a level of measurement. For each variable, the values are normally all of the same kind. However, there may also be missing values.

A database index is a data structure that can improve the speed of data retrieval operations in a database table (e.g., a data set). Database indexes utilize additional writes and storage space to maintain the index data structure. Indexes can be utilized to quickly locate data without having to search every row in a database table each time a database table is accessed. Further, an index can be a copy of select columns of data from a database table that can be searched very efficiently that also includes a low-level disk block address or direct link to the complete row of data it was copied from. Database indexes can be implemented utilizing a variety of different data structures, such as balances treed, B-trees, and hashes.

SUMMARY

Aspects of the present invention disclose a method, computer program product, and system for managing a data index. The method includes one or more processors inserting one or more rows of data sequentially into a data table of a database. The method further includes one or more processors inserting index entries that correspond to the inserted one or more rows of data sequentially into an index of the data table, wherein an index B-tree structure is not built initially during insertion. The method further includes one or more processors determining whether one of: (i) a size threshold of index entries inserted into the index and (ii) a time threshold for inserting index entries into the index, is met. The method further includes responsive to determining that one of: (i) a size threshold of index entries inserted into the index and (ii) a time threshold for inserting index entries into the index, is met, one or more processors building an index-B-tree structure that includes the index entries inserted into the index of the data table.

DETAILED DESCRIPTION

Embodiments of the present invention allow for building an index for a table based on data that is inserted into the table. In response to receiving data inserted into a table, corresponding entries are inserted into an index. In response to either an index size threshold or a time threshold being met, a rebuild process is triggered on the inserted index pages. For example, a rebuild process is triggered for index leaf pages to be built into a B-tree structure.

Some embodiments of the present invention recognize that performance of sequential insert operations into a database can be improved with use of an index. In some embodiments, as the size of an index increases, the speed of insert operations into a corresponding database can decrease.

Implementation of embodiments of the invention may take a variety of forms, and exemplary implementation details are discussed subsequently with reference to the Figures.

Figure 1:
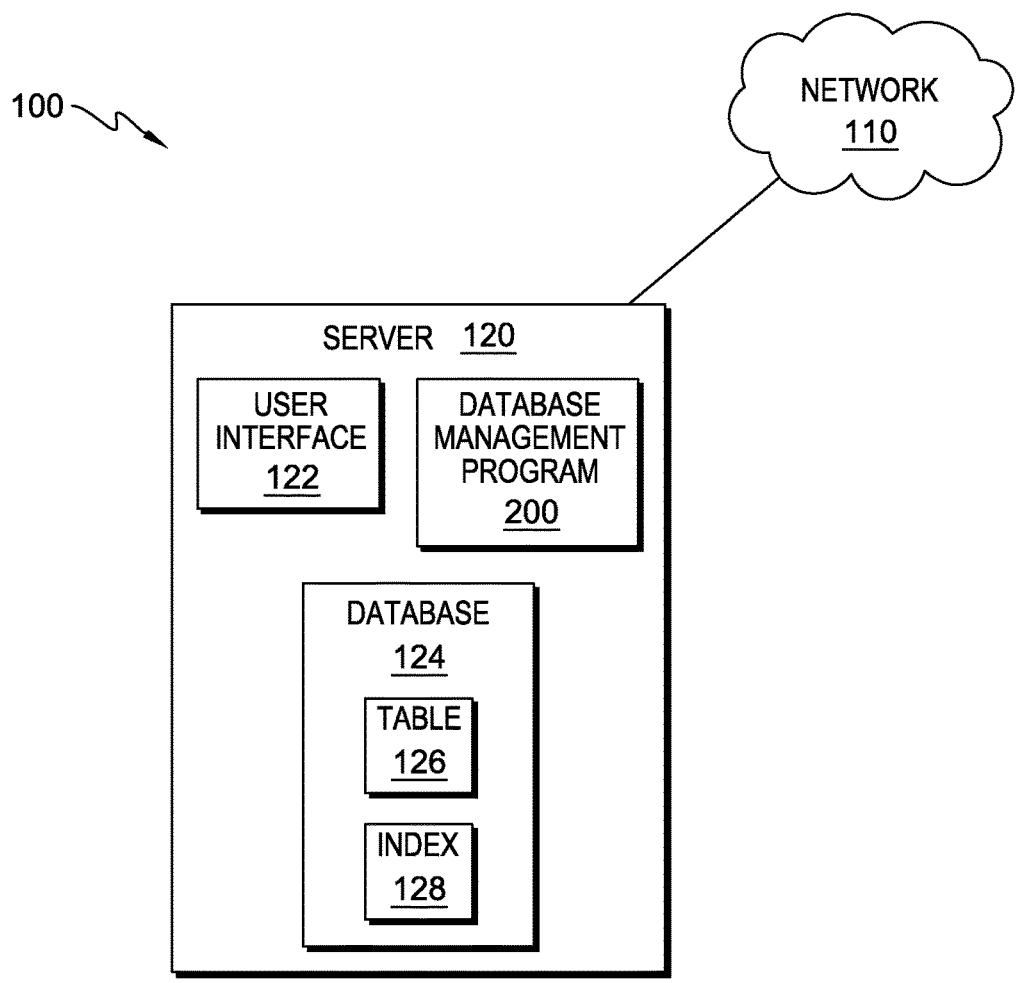
FIG. 1 is a functional block diagram of a data processing environment, in accordance with an embodiment of the present invention.

The present invention will now be described in detail with reference to the Figures. FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

An embodiment of data processing environment 100 includes server 120, which is connected to network 110. In one embodiment, server 120 utilizes network 110 to communicate with other computing devices (not shown). Network 110 can be, for example, a local area network (LAN), a telecommunications network, a wide area network (WAN), such as the Internet, or any combination of the three, and include wired, wireless, or fiber optic connections. In general, network 110 can be any combination of connections and protocols that will support communications between server 120 and other computing devices, in accordance with embodiments of the present invention.

In example embodiments, server 120 can be a desktop computer, a computer server, or any other computer systems known in the art. In certain embodiments, server 120 represents computer systems utilizing clustered computers and components (e.g., database server computers, application server computers, etc.) that act as a single pool of seamless resources when accessed by elements of data processing environment 100 (e.g., computing devices via network 110). In general, server 120 is representative of any electronic device or combination of electronic devices capable of executing computer readable program instructions. Server 120 may include components as depicted and described in further detail with respect to FIG. 3, in accordance with embodiments of the present invention. In various embodiments, server 120 is a database server that hosts and manages one or more databases.

Server 120 includes user interface 122, database 124, and database management program 200. User interface 122 is a program that provides an interface between a user of server 120 and a plurality of applications that reside on the client device. A user interface, such as user interface 122, refers to the information (such as graphic, text, and sound) that a program presents to a user and the control sequences the user employs to control the program. A variety of types of user interfaces exist. In one embodiment, user interface 122 is a graphical user interface. A graphical user interface (GUI) is a type of user interface that allows users to interact with electronic devices, such as a computer keyboard and mouse, through graphical icons and visual indicators, such as secondary notation, as opposed to text-based interfaces, typed command labels, or text navigation. In computing, GUIs were introduced in reaction to the perceived steep learning curve of command-line interfaces which require commands to be typed on the keyboard. The actions in GUIs are often performed through direct manipulation of the graphical elements. In another embodiment, user interface 122 is a script or application programming interface (API).

In an example embodiment, a user can utilize user interface 122 to interact (e.g., send data, view data, etc.) with database 124 on server 120 (e.g., a user locally accessing server 120, a user remotely accessing server 120 via network 110, etc.). Database management program 200 builds an index for a table based on data that is inserted into the table, in accordance with embodiments of the present invention.

In the depicted embodiment, database 124 resides on server 120. In another embodiment, database 124 may reside elsewhere in data processing environment 100, such as independently as a standalone database that is capable of communicating with server 120 via network 110. A database is an organized collection of data. Database 124 can be implemented with any type of storage device, for example, persistent storage 305, which is capable of storing data that may be accessed and utilized by server 120, such as a database server, a hard disk drive, or a flash memory. In other embodiments, database 124 can represent multiple storage devices or databases within server 120.

Database 124 includes table 126 and index 128. Table 126 is a collection of data that includes rows and columns of data. In various embodiments, server 120 (e.g., utilizing database management program 200) inserts data into table, such as rows of data in an insert operation. In other embodiments, table 126 can be representative of additional forms of data sets that can be stored in database 124. Index 128 is a database index that corresponds to table 126. Index 128 can be utilized to locate data within table 126 without having to search every row in table 126 each time table 126 is accessed. Index 128 can be implemented utilizing a variety of different data structures, such as balances treed, B-trees, and hashes. In example embodiments, server 120 utilizes database management program 200 to build and/or modify index 128 based on data that is inserted into table 126.

Figure 2:
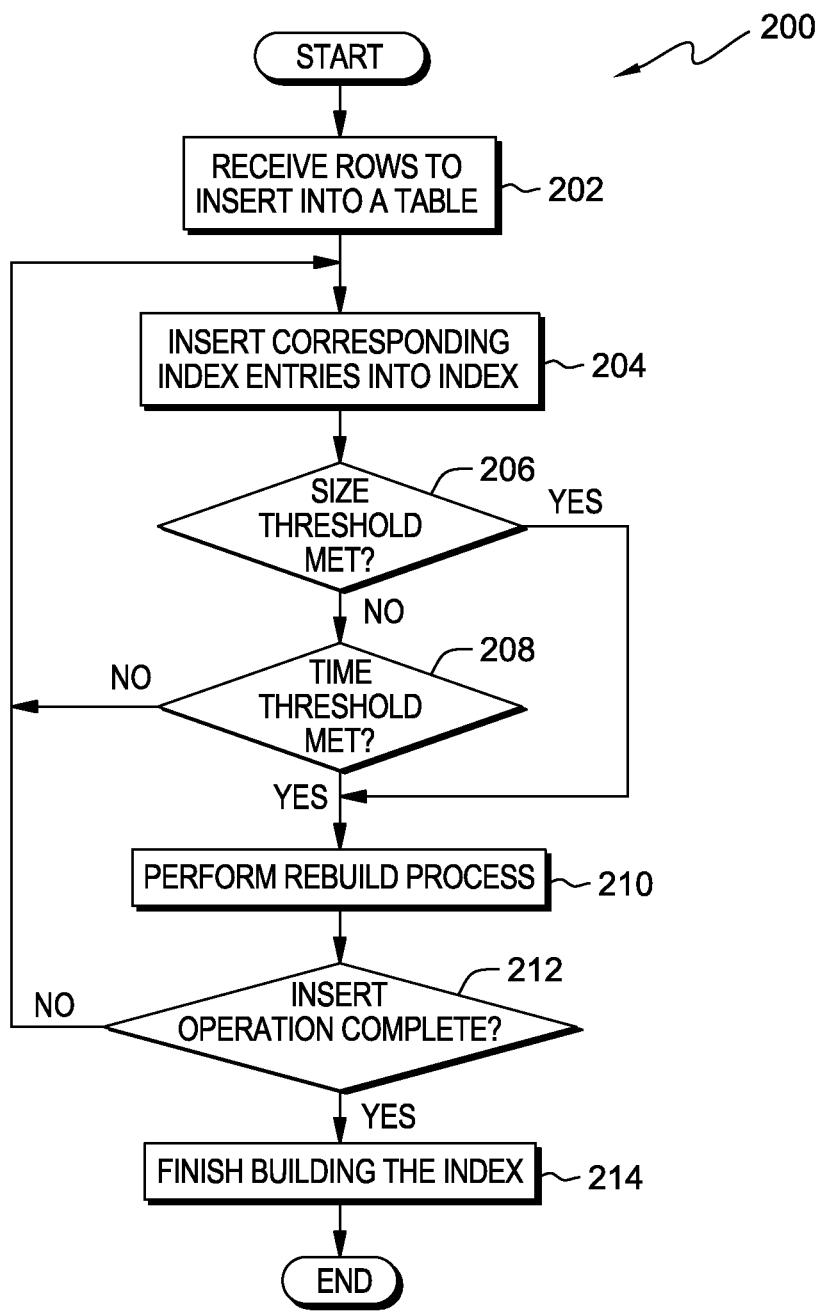
FIG. 2 is a flowchart depicting operational steps of a program for building an index for a table based on data that is inserted into the table, in accordance with embodiments of the present invention.

FIG. 2 is a flowchart depicting operational steps of a database management program 200, a program for building an index for a table based on data that is inserted into the table, in accordance with embodiments of the present invention.

In step 202, database management program 200 receives rows to insert into a table. In one embodiment, database management program 200 receives rows of data (e.g., input via user interface 122 or network 110) to insert into table 126 of database 124. For example, a user of server 120 utilizes user interface 122 to perform an insert operation to insert data (e.g., in the form of rows of data) into table 126. In an additional embodiment, database management program 200 receives the rows sequentially (e.g., following an order of a corresponding index, such as a clustering index).

In an example embodiment, a user utilizes structured query language (SQL) to execute a data insert operation on table 126 of database 124. SQL s a special-purpose programming language designed for managing data held in a relational database management system (RDBMS) or for stream processing in a relational data stream management system (RDSMS). SQL includes a data definition language (DDL) and a data manipulation language (DML). The scope of SQL includes data insert operations, as well as queries, updates and deletes, schema creation and modification, and data access control. In other embodiments, a user can utilize other methods known in the art to send an insert operation or command to table 126. In another embodiment, database management program 200 can receives data in other formats (e.g., columns of data, etc.), provided that the data can be inserted into database 124. In yet another embodiment, database management program 200 can identify rows to insert into table 126 of database 124 (e.g., identify one or more sets of rows from a queue of rows to insert into an index, etc.).

In step 204, database management program 200 inserts the corresponding index entries into index. In one embodiment, database management program 200 inserts index entries that correspond to the rows (or other data) included in the received insert operation (from step 202) into index 128. For example, a user utilizes database management program 200 to execute a SQL insert operation to insert rows of data into table 126, and database management program 200 sequentially inserts the rows of data into table 126 (in step 202). Database management program 200 inserts index entries that correspond to the rows of data inserted into table 126 into index 128.

In an example embodiment, database management program 200 inserts the corresponding index entries into index 128 formatted as sequential index leaf pages. In another embodiment, database management program 200 inserts the corresponding index entries into the index concurrently with inserting the rows of data into table 126 (e.g., step 202 and step 206 can operate simultaneously). Database management program 200 inserts the index entries into index 128 without building a B-tree structure while inserting the entries. Index entries are records for index key information and information that corresponds to a data page (e.g., a row identifier (RID), which can be the same as regular index entries that are included in an index.

In decision step 206, database management program 200 determines whether a size threshold has been met. In one embodiment, database management program 200 determines whether the size threshold has been met for index entries inserted into one or more leaf pages of index 128. The size threshold is a maximum size (e.g., a maximum file size, a maximum number of entries, etc.) of index entries that database management program 200 is inserting into index 128 (in step 204). For example, the size threshold can correspond to the maximum size of data that can be stored in an index leaf page or in a set of index leaf pages. In additional embodiments, the size threshold is a defined value that is set by a user that is associated with database 124.

In response to determining that the size threshold has been met (decision step 206, yes branch), database management program 200 performs a rebuild process (step 210). In response to determining that the size threshold has not been met (decision step 206, no branch), database management program 200 determines whether a time threshold has been met (decision step 208). In various embodiments, database management program 200 monitors the size of the amount of inserted index entries while database management program 200 is inserting the index entries into index 128 and while database management program 200 is inserting the rows of data into table 126 (e.g., decision step 206 occurs concurrently while step 202 and step 204 are operating).

In decision step 208, database management program 200 determines whether a time threshold has been met. In one embodiment, database management program 200 determines whether the time threshold has been met for the process of inserting index entries into index 128. The time threshold is a maximum time duration of operation for database management program 200 inserting index entries into index 128 (in step 204). For example, the time threshold can be a rebuild interval, which defines a maximum amount of time that can elapse between rebuild operations on index 128. In additional embodiments, the time threshold is a defined value that is set by a user that is associated with database 124. In another scenario, if the insert operation finishes, then database management program 200 will eventually detect that the time threshold (e.g., the rebuild interval) has been met.

In response to determining that the time threshold has been met (decision step 208, yes branch), database management program 200 performs a rebuild process (step 210). In response to determining that the time threshold has not been met (decision step 208, no branch), database management program 200 returns to step 204 and continues inserting the corresponding index entries into the index. In various embodiments, database management program 200 monitors the amount of time that has elapsed for inserting index entries while database management program 200 is inserting the index entries into index 128 and while database management program 200 is inserting the rows of data into table 126 (e.g., decision step 208 occurs concurrently while step 202 and step 204 are operating).

In step 210, database management program 200 performs a rebuild operation. In one embodiment, database management program 200 builds an index B-tree structure that includes index entries inserted into index 128 (in step 204). In an example embodiment, database management program 200 builds an index B-tree structure from sequentially inserted index entries (e.g., database management program 200 sequentially inserts index entries in step 204). In various embodiments, database management program 200 can utilize a data indexing algorithm or a combination of data indexing algorithms to build the index B-tree structure from sequentially inserted index entries. Database management program 200 utilizes the sequential insertion of the index entries to directly rebuild the index B-tree since the row identifiers (e.g., RIDs of data pages) of the index entries will already be in sequence. In an example, database management program 200 utilizes an asynchronous rebuilding process to build the index B-tree structure.

In an additional embodiment, database management program 200 builds an index B-tree structure as an index sub-partition in index 128. For example, database management program 200 utilizes index leaf pages (inserted into index 128 in step 204) to build the index B-tree structure as a sub-partition of index 128. In response to determining that either the size threshold is met (decision step 206, yes branch) or the time threshold is met (decision step 208, yes branch), database management program 200 performs a rebuild process of building an index B-tree structure from index entries inserted into index 128 (in step 204).

In another embodiment, if database management program 200 identifies an index entry that is not inserted into index 128 sequentially (e.g., a row identifier for an index entry is not sequential), then database management program 200 completes building the index B-tree structure and then inserts the non-sequential index entry into the corresponding location in the B-tree structure. For example, database management program 200 can identify an index entry with a corresponding row identifier that is lower than the previous now identifier, which can signify a non-sequential index entry.

In decision step 212, database management program 200 determines whether the insert operation is complete. In one embodiment, database management program 200 determines whether the insert operation (initiated in step 202) has completed. In an example embodiment, database management program 200 determines whether all the rows of data and corresponding index entries have been inserted into table 126 and index 128, respectively.

In response to determining that the insert operation is complete (decision step 212, yes branch), database management program 200 finishes building the index (step 214). In another embodiment, in response to determining that the insert operation is complete (decision step 212, yes branch), database management program 200 ends. In response to determining that the insert operation is not complete (decision step 212, no branch), database management program 200 returns to step 204 and continues inserting the corresponding index entries into the index.

In step 214, database management program 200 finishes building the index. In one embodiment, database management program 200 completes the building process of index 128 for the insert operation initiated in step 202. In an example embodiment, database management program 200 finishes the building process of index 128, which allows index 128 to be utilized by server 120 (e.g., by database 124, or via user interface 122). In another embodiment, database management program 200 finishes the building process during the rebuild process for the index (e.g., at the completion of step 210).

Embodiments of the present invention allow for an increase in the efficiency and accuracy of index performance and indexing operations based on the process of partitioning the indexing operations in parallel.

Figure 3:
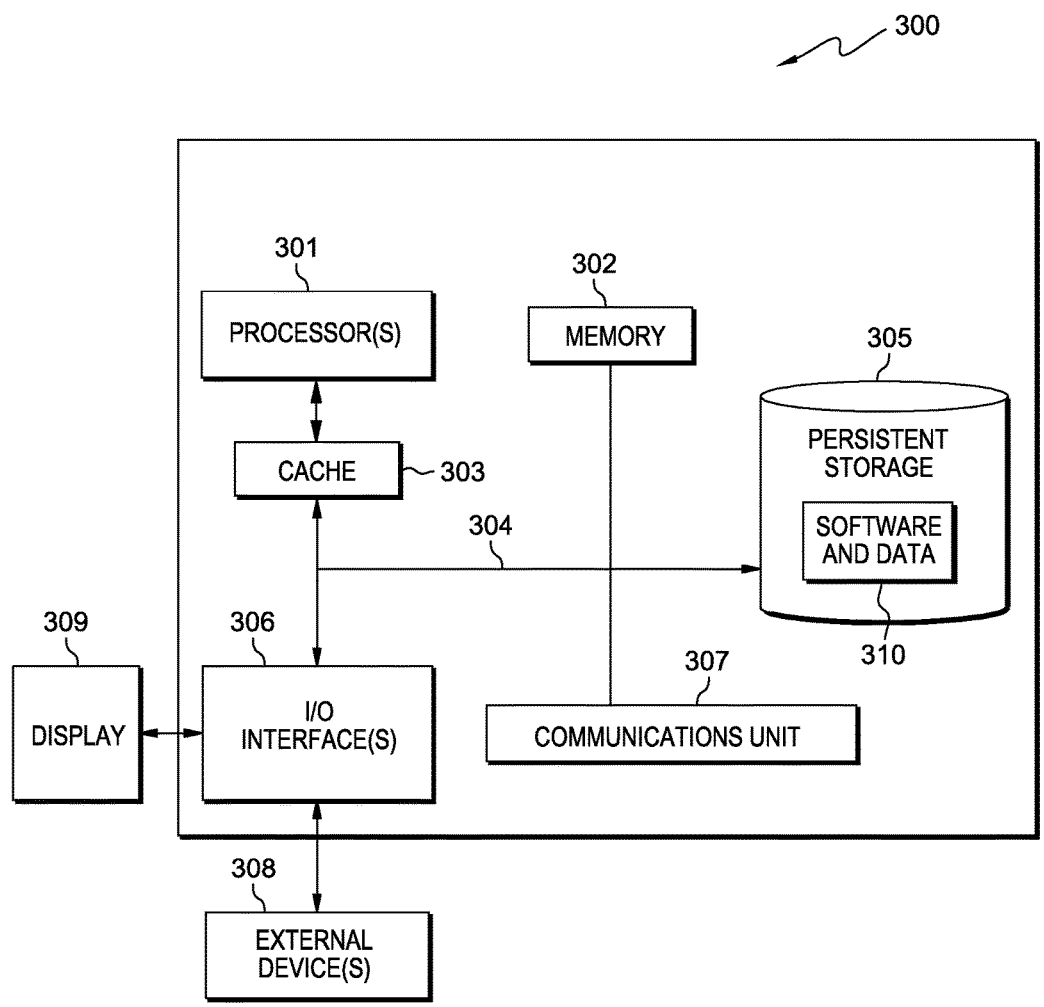
FIG. 3 depicts a block diagram of components of a computing system representative of the server of FIG. 1, in accordance with an embodiment of the present invention.

FIG. 3 depicts computer system 300, which is representative of server 120, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made. Computer system 300 includes processor(s) 301, cache 303, memory 302, persistent storage 305, communications unit 307, input/output (I/O) interface(s) 306, and communications fabric 304. Communications fabric 304 provides communications between cache 303, memory 302, persistent storage 305, communications unit 307, and input/output (I/O) interface(s) 306. Communications fabric 304 can be implemented with any architecture designed for passing data and/or control information between processors (such as microprocessors, communications and network processors, etc.), system memory, peripheral devices, and any other hardware components within a system. For example, communications fabric 304 can be implemented with one or more buses or a crossbar switch.

Memory 302 and persistent storage 305 are computer readable storage media. In this embodiment, memory 302 includes random access memory (RAM). In general, memory 302 can include any suitable volatile or non-volatile computer readable storage media. Cache 303 is a fast memory that enhances the performance of processor(s) 301 by holding recently accessed data, and data near recently accessed data, from memory 302.

Program instructions and data (e.g., software and data 310) used to practice embodiments of the present invention may be stored in persistent storage 305 and in memory 302 for execution by one or more of the respective processor(s) 301 via cache 303. In an embodiment, persistent storage 305 includes a magnetic hard disk drive. Alternatively, or in addition to a magnetic hard disk drive, persistent storage 305 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 305 may also be removable. For example, a removable hard drive may be used for persistent storage 305. Other examples include optical and magnetic disks, thumb drives, and smart cards that are inserted into a drive for transfer onto another computer readable storage medium that is also part of persistent storage 305. Software and data 310 can be stored in persistent storage 305 for access and/or execution by one or more of the respective processors 301 via cache 303. With respect to server 120, software and data 310 includes database management program 200, database 124, table 126, and index 128.

Communications unit 307, in these examples, provides for communications with other data processing systems or devices. In these examples, communications unit 307 includes one or more network interface cards. Communications unit 307 may provide communications through the use of either or both physical and wireless communications links. Program instructions and data (e.g., software and data 310) used to practice embodiments of the present invention may be downloaded to persistent storage 305 through communications unit 307.

I/O interface(s) 306 allows for input and output of data with other devices that may be connected to each computer system. For example, I/O interface(s) 306 may provide a connection to external device(s) 308, such as a keyboard, a keypad, a touch screen, and/or some other suitable input device. External device(s) 308 can also include portable computer readable storage media such as, for example, thumb drives, portable optical or magnetic disks, and memory cards. Program instructions and data (e.g., software and data 310) used to practice embodiments of the present invention can be stored on such portable computer readable storage media and can be loaded onto persistent storage 305 via I/O interface(s) 306. I/O interface(s) 306 also connect to display 309.

Display 309 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for managing a data index, the method comprising:
   prior to building an index B-tree structure:
      receiving, by one or more processors, one or more rows of data sequentially that follow an order;
      identifying, by one or more processors, one or more rows of data within the sequentially received one or more rows of data for insertion;
      i) inserting, by one or more processors, the identified one or more rows of data sequentially into a data table of a database;
      ii) inserting, by one or more processors, index entries that correspond to the inserted one or more rows of data sequentially into an index of the data table, wherein an index B-tree structure is not built initially during insertion;
      iii) determining, by one or more processors, whether a size threshold of index entries inserted into the index is not met, wherein the size threshold is a maximum number of index entries inserted into the index of the data table;
      wherein i), ii), and iii), are performed concurrently;
      responsive to determining the size threshold of index entries inserted into the index is not met, determining, by one or more processors, whether a time threshold for inserting index entries into the index is met, wherein the time threshold is a defined value setting a rebuild interval that defines a maximum time duration that can elapse between rebuild operations on the index;
      responsive to determining the time threshold for inserting index entries into the index is met, asynchronously building, by one or more processors, an index-B-tree structure that includes the index entries inserted into the index of the data table, wherein the index-B-tree structure is an index sub-partition of the index;
   during the building of the index B-tree structure:
      comparing, by one or more computer processors, a row identifier of a first index entry with a row identifier of a second index entry, wherein the first index entry is previous to the second index entry;
      determining, by one or more computer processors, whether the row identifier of the second entry is lower than the row identifier of the first index entry based on the comparison;
      responsive to determining the row identifier of the second index entry is lower than the row identifier of the first index entry, identifying, by one or more computer processors, the second index entry as a non-sequential index entry;
      completing, by one or more computer processors, building of the index B-tree structure without the identified non-sequential index entry, wherein the index B-tree structure is built based on the sequentially inserted one or more rows of data; and
   after completing building of the index B-tree structure:
      inserting, by one or more computer processors, the identified non-sequential index entry into a corresponding location in the completed built index B-tree structure.

2. The method of claim 1, wherein inserting one or more rows of data sequentially into a data table of a database, further comprises:

receiving, by one or more processors, a structured query language (SQL) data insert operation to insert one or more rows of data into the table of the database as a clustering index.

3. The method of claim 2, further comprising:
determining, by one or more processors, whether the received SQL data insert operation is complete.

4. The method of claim 3, further comprising:
responsive to determining that the received SQL data insert operation is complete, inserting, by one or more processors, index entries that correspond to the inserted one or more rows of data sequentially into the index of the data table.

5. The method of claim 1, wherein inserting index entries that correspond to the inserted one or more rows of data sequentially into an index of the data table, further comprises:
inserting, by one or more processors, the index entries that correspond to the inserted one or more rows of sequentially into index leaf pages in the index of the data table;
wherein the index leaf pages are formatted as sequential index leaf pages.

6. The method of claim 1, wherein building an index-B-tree structure that includes the index entries inserted into the index of the data table, further comprises:
building, by one or more processors, index leaf pages into an index B-tree structure.

7. A computer program product for managing a data index, the computer program product comprising:
one or more computer readable storage media and program instructions stored on the one or more computer readable storage media, the program instructions comprising:
prior to building an index B-tree structure:
program instructions to receive one or more rows of data sequentially that follow an order;
program instructions to identify one or more rows of data within the sequentially received one or more rows of data for insertion;
i) program instructions to insert the identified one or more rows of data sequentially into a data table of a database;
ii) program instructions to insert index entries that correspond to the inserted one or more rows of data sequentially into an index of the data table, wherein an index B-tree structure is not built initially during insertion;
iii) program instructions to determine whether a size threshold of index entries inserted into the index is not met, wherein the size threshold is a maximum number of index entries inserted into the index of the data table;
wherein i), ii), and iii), are performed concurrently;
responsive to determining the size threshold of index entries inserted into the index is not met, program instructions to determine whether a time threshold for inserting index entries into the index is met, wherein the time threshold is a defined value setting a rebuild interval that defines a maximum time duration that can elapse between rebuild operations on the index;
responsive to determining the time threshold for inserting index entries into the index is met, program instructions to asynchronously build an index-B-tree structure that includes the index entries inserted into the index of the data table, wherein the index-B-tree structure is an index sub-partition of the index;

during the building of the index B-tree structure:
program instructions to compare a row identifier of a first index entry with a row identifier of a second index entry, wherein the first index entry is previous to the second index entry;
program instructions to determine whether the row identifier of the second entry is lower than the row identifier of the first index entry based on the comparison;
responsive to determining the row identifier of the second index entry is lower than the row identifier of the first index entry, program instructions to identify the second index entry as a non-sequential index entry;
program instructions to complete building of the index B-tree structure without the identified non-sequential index entry, wherein the index B-tree structure is built based on the sequentially inserted one or more rows of data; and
after completing building of the index B-tree structure:
program instructions to insert the identified non-sequential index entry into a corresponding location in the completed built index B-tree structure.

8. The computer program product of claim 7, wherein the program instructions to insert one or more rows of data sequentially into a data table of a database, further comprise program instructions to:
receive a structured query language (SQL) data insert operation to insert one or more rows of data into the table of the database as a clustering index.

9. The computer program product of claim 8, further comprising program instructions, stored on the one or more computer readable storage media, to:
determine whether the received SQL data insert operation is complete.

10. The computer program product of claim 9, further comprising program instructions, stored on the one or more computer readable storage media, to:
responsive to determining that the received SQL data insert operation is complete, insert index entries that correspond to the inserted one or more rows of data sequentially into the index of the data table.

11. The computer program product of claim 7, wherein the program instructions to insert index entries that correspond to the inserted one or more rows of data sequentially into an index of the data table, further comprise program instructions to:
insert the index entries that correspond to the inserted one or more rows of sequentially into index leaf pages in the index of the data table;
wherein the index leaf pages are formatted as sequential index leaf pages.

12. The computer program product of claim 7, wherein the program instructions to build an index-B-tree structure that includes the index entries inserted into the index of the data table, further comprise program instructions to:
build the index leaf pages into an index B-tree structure.

13. A computer system for managing a data index, the computer system comprising:
one or more computer processors;
one or more computer readable storage media; and
program instructions stored on the computer readable storage media for execution by at least one of the one or more processors, the program instructions comprising:

prior to building an index B-tree structure:
  program instructions to receive one or more rows of data sequentially that follow an order;
  program instructions to identify one or more rows of data within the sequentially received one or more rows of data for insertion;
  i) program instructions to insert the identified one or more rows of data sequentially into a data table of a database;
  ii) program instructions to insert index entries that correspond to the inserted one or more rows of data sequentially into an index of the data table, wherein an index B-tree structure is not built initially during insertion;
  iii) program instructions to determine whether a size threshold of index entries inserted into the index is not met, wherein the size threshold is a maximum number of index entries inserted into the index of the data table;
  wherein i), ii), and iii), are performed concurrently;
  responsive to determining the size threshold of index entries inserted into the index is not met, program instructions to determine whether a time threshold for inserting index entries into the index is met, wherein the time threshold is a defined value setting a rebuild interval that defines a maximum time duration that can elapse between rebuild operations on the index;
  responsive to determining the time threshold for inserting index entries into the index is met, program instructions to asynchronously build an index-B-tree structure that includes the index entries inserted into the index of the data table, wherein the index-B-tree structure is an index sub-partition of the index;
during the building of the index B-tree structure:
  program instructions to compare a row identifier of a first index entry with a row identifier of a second index entry, wherein the first index entry is previous to the second index entry;
  program instructions to determine whether the row identifier of the second entry is lower than the row identifier of the first index entry based on the comparison;
  responsive to determining the row identifier of the second index entry is lower than the row identifier of the first index entry, program instructions to identify the second index entry as a non-sequential index entry;
  program instructions to complete building of the index B-tree structure without the identified non-sequential index entry, wherein the index B-tree structure is built based on the sequentially inserted one or more rows of data; and
after completing building of the index B-tree structure:
  program instructions to insert the identified non-sequential index entry into a corresponding location in the completed built index B-tree structure.

14. The computer system of claim 13, wherein the program instructions to insert one or more rows of data sequentially into a data table of a database, further comprise program instructions to:
  receive a structured query language (SQL) data insert operation to insert one or more rows of data into the table of the database as a clustering index.

15. The computer system of claim 14, further comprising program instructions, stored on the computer readable storage media for execution by at least one of the one or more processors, to:
  determine whether the received SQL data insert operation is complete.

16. The computer system of claim 15, further comprising program instructions, stored on the computer readable storage media for execution by at least one of the one or more processors, to:
  responsive to determining that the received SQL data insert operation is complete, insert index entries that correspond to the inserted one or more rows of data sequentially into the index of the data table.

17. The computer system of claim 13, wherein the program instructions to insert index entries that correspond to the inserted one or more rows of data sequentially into an index of the data table, further comprise program instructions to:
  insert the index entries that correspond to the inserted one or more rows of sequentially into index leaf pages in the index of the data table;
  wherein the index leaf pages are formatted as sequential index leaf pages.

18. The computer system of claim 13, wherein the program instructions to build an index-B-tree structure that includes the index entries inserted into the index of the data table, further comprise program instructions to:
  build the index leaf pages into an index B-tree structure.

* * * * *